United States Patent
Xu et al.

(10) Patent No.: US 9,356,775 B1
(45) Date of Patent: May 31, 2016

(54) CLOCK DATA RECOVERY (CDR) PHASE WALK SCHEME IN A PHASE-INTERPOLATER-BASED TRANSCEIVER SYSTEM

(71) Applicant: Xilinx, Inc., San Jose, CA (US)

(72) Inventors: Yu Xu, Palo Alto, CA (US);
Cheng-Hsiang Hsieh, Hsinchu (TW);
Yohan Frans, Palo Alto, CA (US);
Kun-Yung Chang, Los Altos Hills, CA (US)

(73) Assignee: XILINX, INC., San Jose, CA (US)

( * ) Notice: Subject to any disclaimer, the term of this patent is extended or adjusted under 35 U.S.C. 154(b) by 0 days.

(21) Appl. No.: 14/795,169

(22) Filed: Jul. 9, 2015

(51) Int. Cl.
*H04L 7/033* (2006.01)
*H04L 7/04* (2006.01)

(52) U.S. Cl.
CPC ............... *H04L 7/041* (2013.01); *H04L 7/033* (2013.01)

(58) Field of Classification Search
CPC ........... H03L 7/06; H03L 7/08; H03L 7/0807; H03L 7/087; H04L 7/0016; H04L 7/002; H04L 7/0025; H04L 7/0029; H04L 7/033; H04L 7/041; H04L 7/042
USPC .......................... 375/326, 327, 371, 373, 376; 326/93–99; 327/144, 147, 156
See application file for complete search history.

(56) References Cited

U.S. PATENT DOCUMENTS

| | | | |
|---|---|---|---|
| 8,184,029 B1 | 5/2012 | Hsieh et al. | |
| 8,253,451 B1 | 8/2012 | Hsieh et al. | |
| 8,666,013 B1 | 3/2014 | Khor et al. | |
| 8,824,616 B1 | 9/2014 | Gopalakrishnan | |
| 8,923,463 B1 | 12/2014 | Jenkins et al. | |
| 8,934,594 B1 * | 1/2015 | Malhotra | H04L 1/0054 375/355 |
| 2007/0047680 A1 * | 3/2007 | Okamura | H04L 1/24 375/348 |
| 2010/0211728 A1 * | 8/2010 | Naujokat | G11C 7/22 711/105 |
| 2013/0216014 A1 | 8/2013 | Kong et al. | |
| 2014/0253195 A1 * | 9/2014 | Chandrasekaran | H03K 5/1565 327/175 |
| 2014/0266338 A1 * | 9/2014 | Malipatil | H03L 7/00 327/155 |

* cited by examiner

*Primary Examiner* — Young T Tse
(74) *Attorney, Agent, or Firm* — Steven Roberts

(57) ABSTRACT

Methods and apparatus are described for synchronously stepping at least one of a data phase interpolator (PI) code or a crossing PI code in a clock and data recovery (CDR) circuit until one or more preset criteria are satisfied. One example method generally includes determining that a condition has been met; based on the determination, stepping, in a CDR circuit, at least one of a data PI code or a crossing PI code for each cycle of a clock; stopping the stepping based on one or more criteria to generate a predetermined state of the data PI code and the crossing PI code, wherein the predetermined state comprises an offset between the data PI code and the crossing PI code; receiving a data stream; and performing clock and data recovery on the data stream based on the offset between the data PI code and the crossing PI code.

20 Claims, 5 Drawing Sheets

CLOCK DATA RECOVERY (CDR) PHASE WALK SCHEME IN A PHASE-INTERPOLATER-BASED TRANSCEIVER SYSTEM

TECHNICAL FIELD

Examples of the present disclosure generally relate to electronic circuits and, more particularly, to techniques for clock data recovery.

BACKGROUND

Integrated circuits (Cs) may be implemented to perform specified functions. One type of IC is a programmable IC, such as a field programmable gate array (FPGA). An FPGA typically includes an array of programmable tiles. These programmable tiles may include, for example, input/output blocks (IOBs), configurable logic blocks (CLBs), dedicated random access memory blocks (BRAM), multipliers, digital signal processing blocks (DSPs), processors, dock managers, delay lock loops (DLLs), and so forth. Another type of programmable IC is the complex programmable logic device, or CPLD, A CPLD includes two or more "function blocks" connected together and to input/output (I/O) resources by an interconnect switch matrix. Each function block of the CPLD includes a two-level AND/OR structure similar to those used in programmable logic arrays (PLAs) and programmable array logic (PAL) devices. Other programmable ICs are programmed by applying a processing layer, such as a metal layer, that programmably interconnects the various elements on the device. These programmable ICs are known as mask programmable devices. The phrase "programmable IC" can also encompass devices that are only partially programmable, such as application specific integrated circuits (ASICs).

These and other types of programmable ICs may be capable of transmitting a high-speed digital data signal via transmission lines to a receiver without an accompanying dock signal. A clock data recovery (CDR) circuit in the receiver typically generates one or more clock signals from an approximate frequency reference signal and then phase aligns the docks signals to the transitions in or another portion of the received data signal. The receiver uses the clock signals to sample data bits in the received data signal.

SUMMARY

One example of the present disclosure is a method of performing clock and data recovery. The method generally includes determining that a condition has been met; based on the determination, stepping, in a clock data and recovery (CDR) circuit, at least one of a data phase interpolator (PI) code or a crossing PI code for each cycle of a clock; stopping the stepping based on one or more criteria to generate a predetermined state of the data PI code and the crossing PI code, wherein the predetermined state comprises an offset between the data PI code and the crossing PI code; receiving a data stream; and performing clock and data recovery on the data stream based on the offset between the data PI code and the crossing PI code.

Another example of the present disclosure is a clock and data recovery system. The clock and data recovery system generally includes at least one phase interpolator (PI); a clock and data recovery (CDR) circuit connected with the at least one PI, wherein the CDR circuit comprises one or more phase detectors. The CDR circuit is typically configured to determine that a condition has been met; based on the determination, step at least one of a data PI code or a crossing PI code for each cycle of a system clock; stop the stepping based on one or more criteria to generate a predetermined state of the data PI code and the crossing PI code, wherein the predetermined state comprises an offset between the data PI code and the crossing PI code; and output the data PI code and the crossing PI code to the at least one PI.

Yet another example of the present disclosure is an apparatus for performing clock and data recovery. The apparatus generally includes means for determining that a condition has been met; means for stepping, based on the determination, at least one of a data phase interpolator (PI) code or a crossing PI code for each cycle of a clock; means for stopping the stepping based on one or more criteria to generate a predetermined state of the data PI code and the crossing PI code, wherein the predetermined state comprises an offset between the data PI code and the crossing PI code; means for receiving a data stream; and means for performing clock and data recovery on the data stream based on the offset between the data PI code and the crossing PI code.

These and other aspects may be understood with reference to the following detailed description.

BRIEF DESCRIPTION OF THE DRAWINGS

So that the manner in which the above-recited features of the present disclosure can be understood in detail, a more particular description of the disclosure, briefly summarized above, may be had by reference to examples, some of which are illustrated in the appended drawings. It is to be noted, however, that the appended drawings illustrate only typical examples of this disclosure and are therefore not to be considered limiting of its scope, for the disclosure may admit to other equally effective examples.

DETAILED DESCRIPTION

Examples of the present disclosure provide techniques and apparatus for synchronously stepping at least one of a data phase interpolator (PI) code or a crossing PI code in a clock and data recovery (CDR) circuit until one or more preset criteria are satisfied. Such stepping may be performed after a particular condition has been met, such as after the CDR circuit exits a reset mode or after an asynchronous reset procedure in a mission mode. By synchronously stepping the data PI code and/or the crossing PI code, timing violations of clock dividers in a receiver portion of a PI-based transceiver system may be avoided.

Example Programmable Device Architecture

Figure 1:
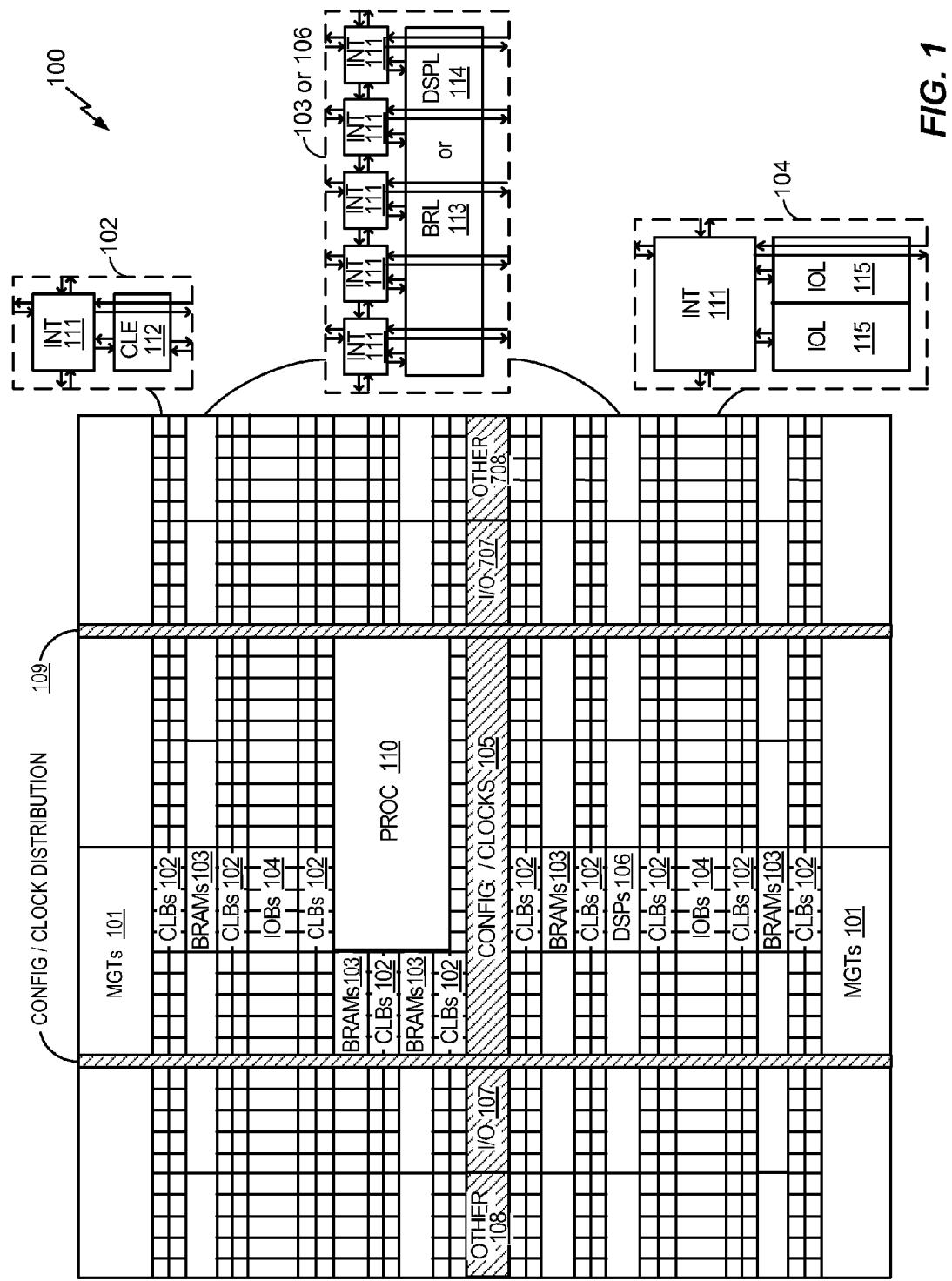
FIG. 1 is a block diagram illustrating an example architecture for a programmable device, in accordance with an example of the present disclosure.

FIG. 1 is a block diagram illustrating an example architecture 100 for a programmable device, in accordance with an example of the present disclosure. The architecture 100 may be implemented within a field programmable gate array (FPGA), for example. As shown, the architecture 100 includes several different types of programmable circuitry, e.g., logic, blocks. For example, the architecture 100 may include a large number of different programmable tiles including multi-gigabit transceivers (MGTs) 101, configurable logic blocks (CLBs) 102, random access memory blocks (BRAMs) 103, input/output blocks (IOBs) 104, configuration and clocking logic (CONFIG/CLOCKS) 105, digital signal processing (DSP) blocks 106, specialized I/O blocks 107 (e.g., configuration ports and clock ports), and other programmable logic 108, such as digital clock managers, analog-to-digital converters (ADCs), system monitoring logic, and the like.

In some FPGAs, each programmable tile includes a programmable interconnect element (INT) 111 having standardized connections to and from a corresponding INT 111 in each adjacent tile. Therefore, the INTs 111, taken together, implement the programmable interconnect structure for the illustrated FPGA. Each INT 111 also includes the connections to and from the programmable logic element within the same tile, as shown by the examples included at the far right of FIG. 1.

For example, a CLB 102 may include a configurable logic element (CLE) 112 that can be programmed to implement user logic plus a single INT 111. A BRAM 103 may include a BRAM logic element (BRL) 113 in addition to one or more INTs 111. Typically, the number of INTs 111 included in a tile depends on the width of the tile. In the pictured example, a BRAM tile has the same width as five CLBs, but other numbers (e.g., four) can also be used. A DSP block 106 may include a DSP logic element (DSPL) 114 in addition to an appropriate number of INTs 111. An 10B 104 may include, for example, two instances of an I/O logic element (IOL) 115 in addition to one instance of an INT 111. As will be clear to a person having ordinary skill in the art, the actual I/O pads connected, for example, to the IOL 115 typically are not confined to the area of the IOL 115.

In the example architecture 100 depicted in FIG. 1, a horizontal area near the center of the die (shown shaded in FIG. 1) is used for configuration, clock, and other control logic (CONFIG/CLOCKS 105). Other vertical areas 109 extending from this central area may be used to distribute the clocks and configuration signals across the breadth of the FPGA.

Some FPGAs utilizing the architecture 100 illustrated in FIG. 1 include additional logic blocks that disrupt the regular row structure making up a large part of the FPGA. The additional logic blocks may be programmable blocks and/or dedicated circuitry. For example, a processor block depicted as PROC 110 spans several rows of CLBs 102 and BRAMs 103.

The PROC 110 may be implemented as a hard-wired processor that is fabricated as part of the die that implements the programmable circuitry of the FPGA. The PROC 110 may represent any of a variety of different processor types and/or systems ranging in complexity from an individual processor (e.g., a single core capable of executing program code) to an entire processing system having one or more cores, modules, co-processors, interfaces, or the like.

In a more complex arrangement, for example, the PROC 110 may include one or more cores (e.g., central processing units), cache memories, a memory controller, unidirectional and/or bidirectional interfaces configurable to couple directly to I/O pins (e.g., I/O pads) of the IC and/or couple to the programmable circuitry of the FPGA. The phrase "programmable circuitry" can refer to programmable circuit elements within an IC (e.g., the various programmable or configurable circuit blocks or tiles described herein) as well as the interconnect circuitry that selectively couples the various circuit blocks, tiles, and/or elements according to configuration data that is loaded into the FPGA. For example, portions shown in FIG. 1 that are external to the PROC 110 may be considered part of the, or the, programmable circuitry of the FPGA.

FIG. 1 is intended to illustrate an example architecture 100 that can be used to implement an FPGA that includes programmable circuitry (e.g., a programmable fabric) and a processing system. For example, the number of logic blocks in a row, the relative width of the rows, the number and order of rows, the types of logic blocks included in the rows, the relative sizes of the logic blocks, and the interconnect/logic implementations included at the right of FIG. 1 are exemplary. In an actual FPGA, for example, more than one adjacent row of CLBs 102 is typically included wherever the CLBs appear, in an effort to facilitate the efficient implementation of a user circuit design. The number of adjacent CLB rows, however, can vary with the overall size of the FPGA. Further, the size and/or positioning of the PROC 110 within the FPGA is for purposes of illustration only and is not intended as a limitation of the one or more examples of the present disclosure.

As described below, one or more MGTs 101 in the programmable device of FIG. 1 may perform clock and data recovery on a high-speed digital data stream, as well as phase walking.

Example CDR Phase Walking

Figure 2:
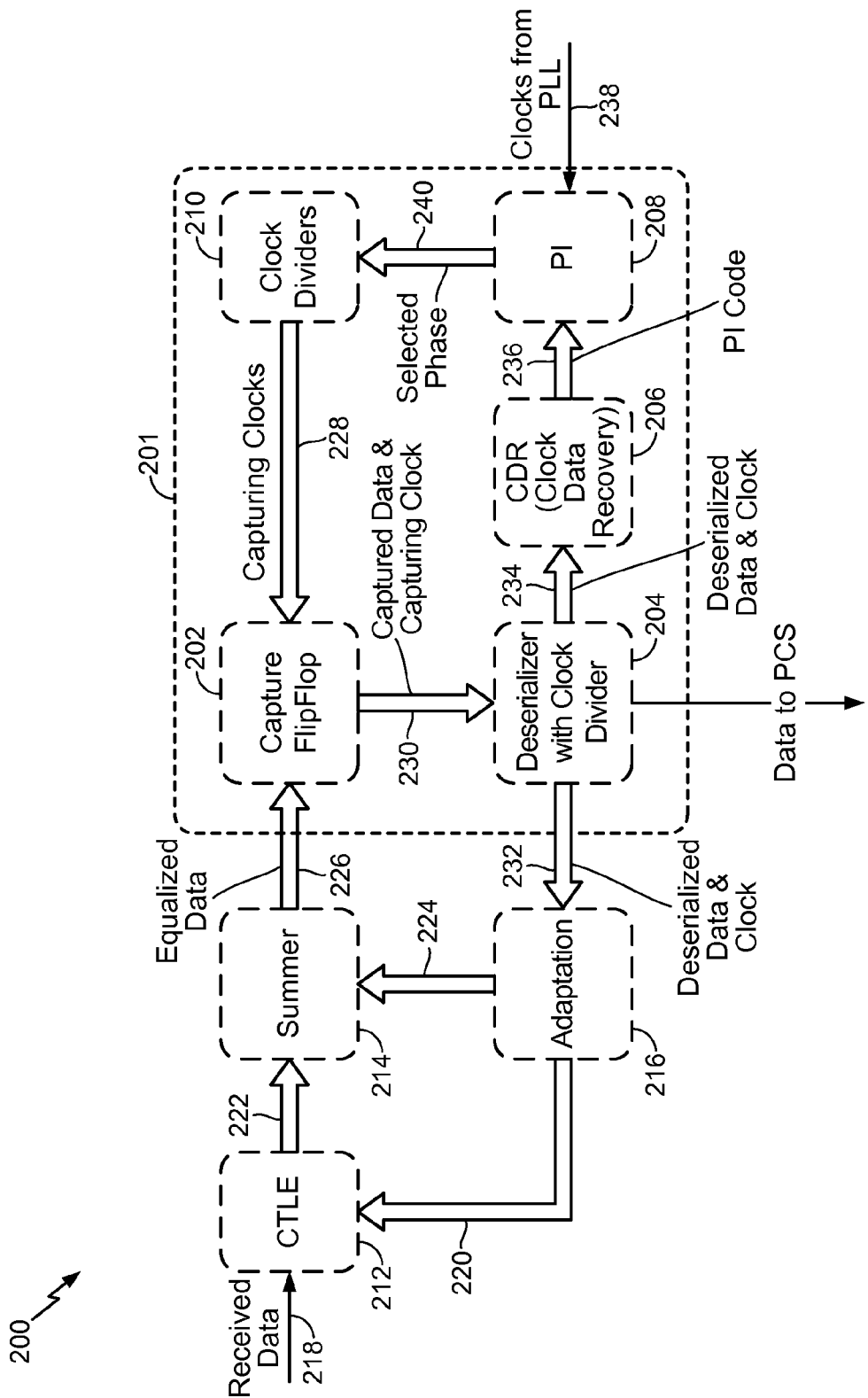
FIG. 2 is a block diagram of an example receiver portion of a phase-interpolator-based transceiver system, in accordance with an example of the present disclosure.

FIG. 2 is a block diagram of a receiver 200 for a phase-interpolator-based transceiver system, in accordance with an example of the present disclosure. A closed-loop portion 201 of the receiver 200 may include a set of capture flip-flops 202, a deserializer 204, a digital clock and data recovery (CDR) circuit 206, a set of phase interpolators (PIs) 208, and a set of clock dividers 210. The receiver 200 may also include a continuous time linear equalizer (CTLE) 212, a summer 214, and an adaptation circuit 216.

A high-speed digital data stream 218 may be received by the CTLE 212, which performs linear equalization on the data stream 218 using input 220 from the adaptation circuit 216. The equalized data 222 may be adjusted with input control signal 224 from the adaptation circuit 216, and the data 226 output by the summer 214 may enter the closed-loop portion 201 of the receiver 200.

The set of capture flip-flops 202 may be clocked by capturing clocks 228 generated by the set of clock dividers 210 (also known as frequency dividers) to capture the data 226 output by the summer 214. The captured data and crossings, as well as the capturing clock(s) 230, output by the set of capture flip-flops 202 may be deserialized by the deserializer 204. The deserializer 204 may output the deserialized data and crossings and clock signals 232, 234 to the adaptation circuit 216 and to the digital CDR circuit 206.

The CDR circuit 206 may include a plurality of bang-bang phase detectors for indicating phase relationships with detected data transitions in the deserialized data and clock signals 234. While data crossings are used herein as an example, it should be understood that other types of data transitions may be used, such as edge detection, zero crossings, and the like. The output of the CDR circuit 206 may be coded output 236, such as a binary-coded output or other coded output, for the set of PIs 208. The coded output 236 may include a data PI code for the data and a crossing PI code for the crossings. For some examples, each PI code may have a 7-bit value ranging from 0 to 127 in a wrap-around code. In this case, each PI code represents one of 128 possible values for phase ranging from 0 to 360°.

The set of PIs 208 may receive the coded output 236 from the CDR circuit 206 and multiple phase-shifted clocks 238 from a clock module, such as a phase-locked loop (PLL) (not shown). The set of PIs 208 may select a phase relationship for the data stream based on the coded output 236 and the clocks 238. The selected phase 240 may be represented by a voltage (difference) output by the set of PIs 208 to the set of clock dividers 210.

The bang-bang phase detectors in the digital CDR circuit 206 use both data and crossing information for each data bit (each "eye" in an eye diagram of high-speed digital data). To satisfy the bang-bang phase detection scheme, there is crossing data coming from the deserializer 204, which is used in the CDR circuit 206. The crossing phase is the phase with a static total offset (TO) on top of the data phase. The total offset may consist of three portions: (1) IO—ideal offset defined to be half-UI (unit interval) or zero-UI depending on full/sub-rate clock scheme; (2) DXD—adjustment between data and cross due to "eye" irregularity; and (3) CKOK—adjustment from clock signal calibration outside of the CDR. Therefore, $$TO=IO+DXD+CKOK$$

The total offset may be built into the CDR circuit 206 after getting out of reset. Because TO is initialized before the CDR circuit 206 exits a reset mode, TO may be treated as a static value and may be loaded all at once through a "load" operation. The total offset may also be forced away via an asynchronous reset procedure in a mission mode. A conventional asynchronous reset may force both the data and crossing PI codes to jump to zero. Both methods ("load" and "forced away") may possibly invoke a sizable code change and crossing PI phase shift, thereby potentially causing trigger critical path timing violations in the set of clock dividers 210, which leads to failure of the PI-based transceiver system.

Examples of the present disclosure use a synchronous phase walk for changing the offset between the data PI code and the crossing PI code in such scenarios, rather than jumping suddenly to the desired data and crossing PI code values. The synchronous phase walk for the former scenario (namely, exiting from reset mode) is referred to herein as an "Initial Walk," whereas the phase walk for the latter scenario (namely, an asynchronous reset procedure in a mission mode) is referred to herein as a "Reset Walk." With either type of synchronous phase walk, the change for a single clock cycle may be limited to a fraction (e.g., $\frac{1}{16}$, $\frac{1}{32}$, $\frac{1}{64}$) of a UI size, and the phases may step every clock cycle until preset criteria are satisfied.

Figure 3:
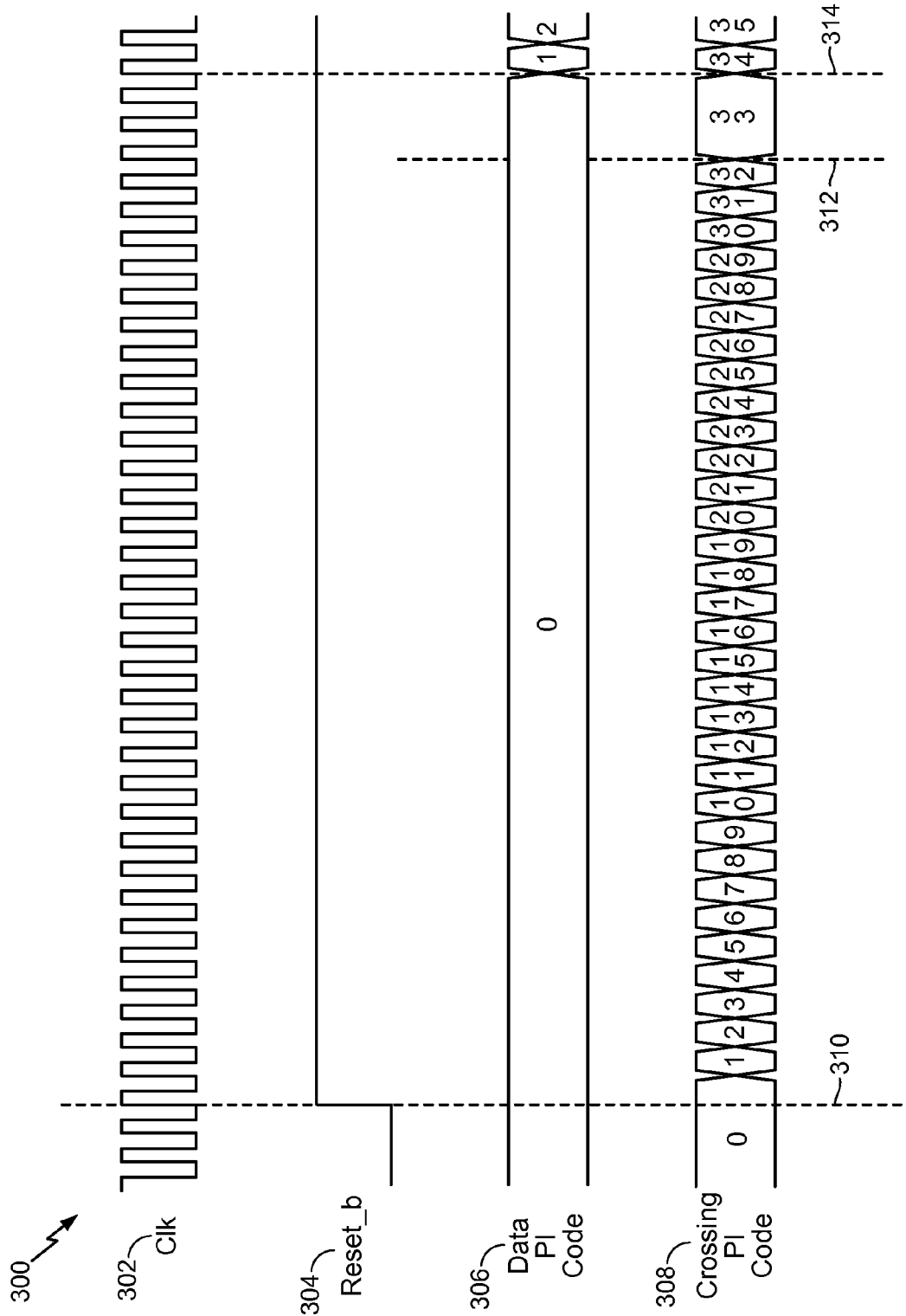
FIG. 3 is an example timing diagram illustrating incrementing a crossing phase interpolator (PI) code while holding a data PI code constant for an "Initial Walk," in accordance with an example of the present disclosure.

FIG. 3 is a timing diagram 300 illustrating an example Initial Walk, in accordance with an example of the present disclosure. For the Initial Walk, both the data PI code 306 and the crossing PI code 308 may have initial PI code values (e.g., code values equal to 0). Once a reset signal 304 (labeled "Reset_b") has been enabled (e.g., transitioned from logic low to logic high) at time 310, the CDR circuit 206 may step the crossing PI code 308 every cycle of the reference clock 302 (labeled "Clk") for the receiver 200 while the data PI code 306 is held constant. The crossing PI code 308 may be stepped every clock cycle until reaching a preset TO. In the example of FIG. 3, IO=32, DXD=1, and CKOK=0, yielding TO=33. Rather than jumping straight to the preset TO, as in conventional CDR circuits, the crossing PI code 308 is built to the preset TO at time 312 by stepping the crossing PI code 308 synchronously with the clock 302. For other examples, the data PI code 306 may be synchronously stepped while the crossing PI code 308 is held constant. Although the crossing PI code 308 (or the data PI code 306) is stepped by one PI code value every clock cycle, the CDR circuit 206 may step the crossing PI code (or the data PI code) by more than one PI code value for some examples. After the total offset between the PI codes 306, 308 has been built up, the CDR circuit 206 may begin its adaptation (e.g., by adjusting the PI codes based on bang-bang phase detection) at some time 314 later.

For some examples, the Initial Walk may proceed in whichever direction will reach the preset TO more quickly (i.e., take the shorter route to get ready earlier), due to the continuity of the set of PIs 208. In the example of FIG. 3, the CDR circuit 206 incremented the crossing PI code 308 every cycle of the reference clock 302. For other examples, the crossing PI code 308 (or the data PI code 306) may be decremented instead. In this case, the crossing PI code 308 starts with 0 once reset is released, walks to 127 in the first cycle, then 126 in the second cycle, etc., continuing this process until the crossing PI code reaches the predetermined TO. During this walking scheme, the data PI code 306 stays at 0.

Figure 4:
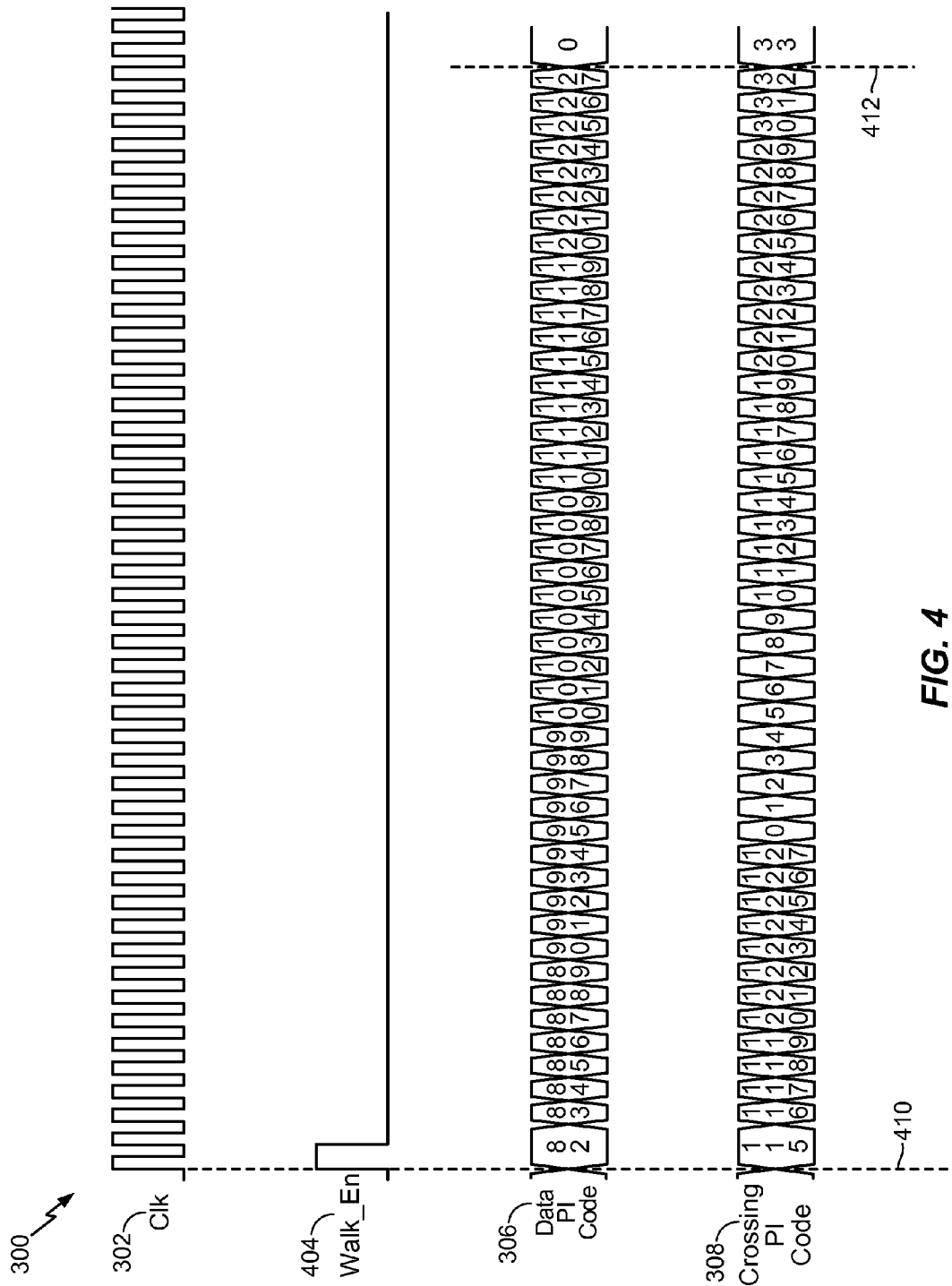
FIG. 4 is an example timing diagram illustrating incrementing both the data and crossing PI codes together for a "Reset Walk," in accordance with an example of the present disclosure.

FIG. 4 is an example timing diagram 400 illustrating an example Reset Walk, in accordance with an example of the present disclosure. For the Reset Walk, both the data PI code 306 and the crossing PI code 308 may have starting PI code values (e.g., 82 and 115, respectively), with a particular offset therebetween, as determined by the CDR circuit 206 during operation. Once an enable signal (labeled "Walk_En") has been triggered at time 410 (e.g., due to an asynchronous reset), the CDR circuit 206 may step the data PI code 306 and the crossing PI code 308 together every cycle of the reference clock 302, such that the TO remains unchanged. For some examples, the PI codes 306, 308 may be stepped every clock cycle until the data PI code 306 reaches a preset code value (e.g., a code value of 0), at time 412. After the preset code value for the particular PI code has been reached by synchronous stepping, the CDR circuit 206 may stay unchanged until reset is released before the CDR circuit 206 returns to performing its normal adaptation.

Because reset operation in the mission mode is not time sensitive, the Reset Walk need not be capable of bidirectional operation. In other words, the Reset Walk may involve incrementing (or decrementing) both PI codes 306, 308 together according to a predetermined direction, regardless whether decrementing (or incrementing) would reach the preset code value of the particular PI code faster.

According to some examples, the Reset Walk need not be used. Rather, the Initial Walk may be performed for both scenarios: (1) the first time the CDR circuit 206 exits reset and (2) after an asynchronous reset.

By performing synchronous phase walking as described above, sudden significant PI code changes are avoided. Therefore, the selected phase 240 output by the set of PIs 208 should not shift suddenly and possibly cause timing violations in the set of clock dividers 210.

Example Operations for Performing Clock and Data Recovery

Figure 5:
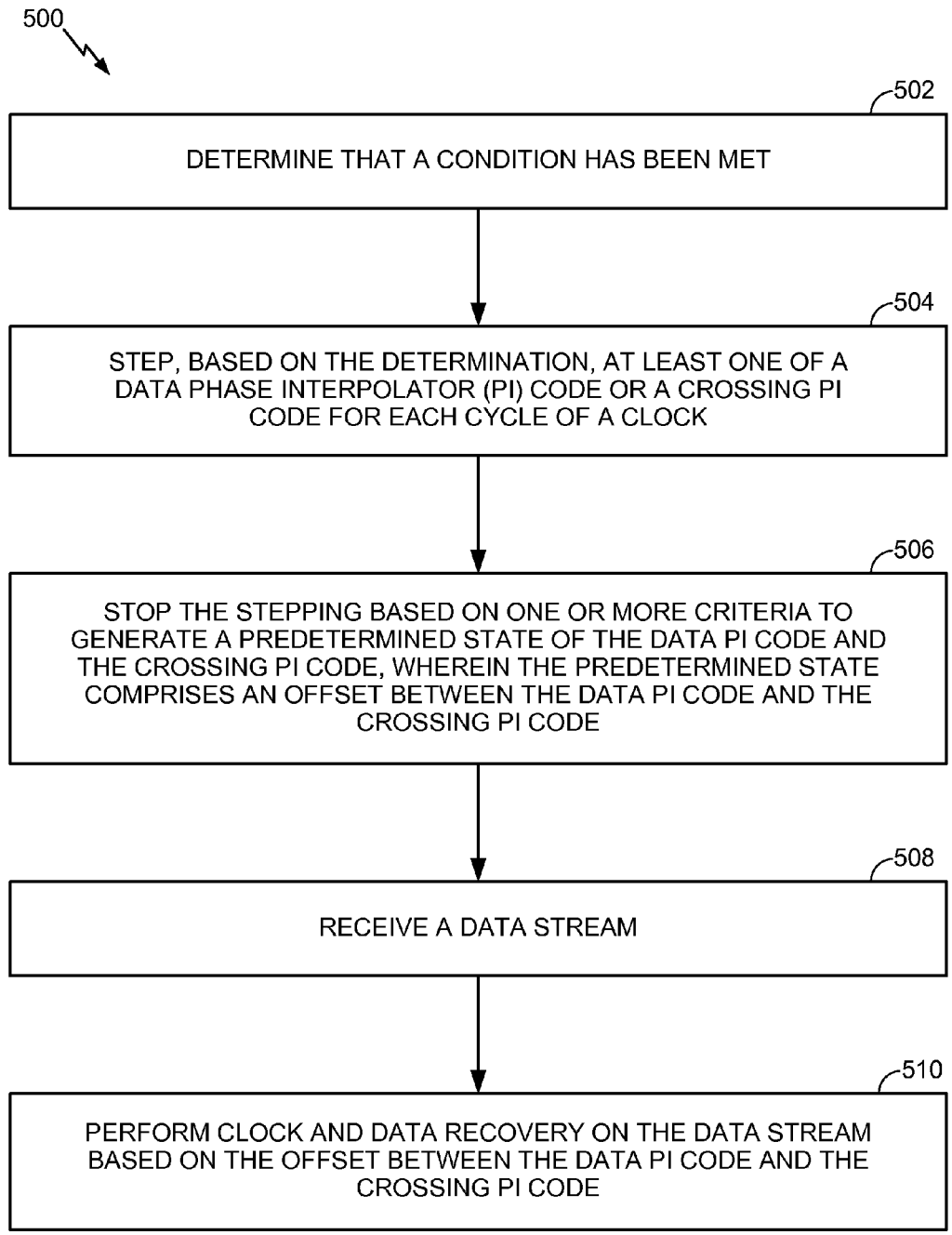
FIG. 5 is a flow diagram of example operations for clock and data recovery, in accordance with an example of the present disclosure.

FIG. 5 is a flow diagram of example operations 500 for performing clock and data recovery, in accordance with an example of the present disclosure. The operations 500 may be performed, for example, by an apparatus having a CDR circuit for clock and data recovery of a high-speed digital data signal (e.g., the receiver 200 of FIG. 2). One example apparatus is a programmable IC with a PI-based transceiver system, such as an FPGA implementing the architecture 100 of FIG. 1 with one or more MGTs 101.

The operations 500 may begin, at block 502, with the apparatus determining that a condition has been met. Based on the determination at block 502, the apparatus (e.g., a CDR circuit of the apparatus) may step at least one of a data PI code or a crossing PI code for each cycle of a clock at block 504. At block 506, the apparatus may stop the stepping based on one or more criteria to generate a predetermined state of the data PI code and the crossing PI code. The predetermined state may comprise an offset between the data PI code and the crossing PI code. For example, the predetermined state may include the data PI code having a code value of 0 and the crossing PI code having a code value equal to a preset value for the offset (e.g., a nominal offset).

For some examples the apparatus (e.g., the CDR circuit) may adjust the offset between the data and crossing PI codes starting from the predetermined state. At block 508, the apparatus may receive a data stream (e.g., a high-speed digital data stream). At block 510, the apparatus may perform clock and data recovery on the data stream based on the (adjusted) offset between the data PI code and the crossing PI code.

According to some examples, the stepping at block 504 involves incrementing (or decrementing) the at least one of the data PI code or the crossing PI code by a single code value for each cycle of the clock.

According to some examples, the condition includes an initial exit of the CDR circuit from a reset mode. In this case, the stepping at block 504 may entail holding the data PI code constant (e.g., at a code value of 0) and stepping the crossing PI code while the data PI code is being held. For some examples, the operations 500 further involve setting the data PI code and the crossing PI code to have the code value of 0 before the stepping. For some examples, the one or more criteria include the crossing PI code reaching a code value equal to a preset value for the predetermined state. For some examples, the stepping at block 504 involves incrementing or decrementing the crossing PI code according to which direction will reach the preset value faster.

According to some examples, the condition includes an asynchronous reset operation. For some examples, the stepping at block 504 may involve stepping the data PI code and the crossing PI code together with the offset maintained therebetween. In this case, the one or more criteria may include the data PI code reaching a particular code value (e.g., a code value of 0).

According to some examples, the stepping at block 504 may prevent the at least one of the data PI code or the crossing PI code from jumping to the predetermined state of the data PI code and the crossing PI code in a single cycle of the clock before the performing at block 510 (or before adjusting the offset in the CDR circuit.

According to some examples, the apparatus may performing the clock and data recovery at block 510 by adjusting the offset between the data PI code and the crossing PI code (starting from the predetermined state) based on the data stream and performing the clock and data recovery on the data stream using the adjusted offset between the data PI code and the crossing PI code.

As used herein (including the claims that follow), a phrase referring to "at least one of" a list of items refers to any combination of those items, including single members. As an example, "at least one of: x, y, and z" is intended to cover: x, y, z, x-y, x-z, y-z, x-y-z, and any combination thereof (e.g., x-y-y and x-x-y-z).

While the foregoing is directed to examples of the present disclosure, other and further examples of the disclosure may be devised without departing from the basic scope thereof, and the scope thereof is determined by the claims that follow.

What is claimed is:

1. A method of performing clock and data recovery, comprising:
    detecting occurrence of a reset condition;
    in response to occurrence of the reset condition, stepping, in a clock and data recovery (CDR) circuit, at least one of a data phase interpolator (PI) code or a crossing PI code for each cycle of a clock;
    stopping the stepping based on one or more criteria of the data PI code or the crossing PI code to generate a predetermined state of the data PI code and the crossing PI code, wherein the predetermined state comprises an offset between the data PI code and the crossing PI code;
    receiving a data stream; and
    performing the clock and data recovery on the data stream based on the offset between the data PI code and the crossing PI code.

2. The method of claim 1, wherein the stepping comprises incrementing the at least one of the data PI code or the crossing PI code by a single code value for each cycle of the clock.

3. The method of claim 1, wherein the reset condition comprises an initial exit of the CDR circuit from a reset mode.

4. The method of claim 3, wherein the stepping comprises:
    holding the data PI code at a code value of 0; and
    stepping the crossing PI code while the data PI code is being held.

5. The method of claim 4, further comprising setting the data PI code and the crossing PI code to have the code value of 0 before the stepping.

6. The method of claim 4, wherein the one or more criteria comprise the crossing PI code reaching a code value equal to a preset value for the predetermined state.

7. The method of claim 6, wherein the stepping comprises incrementing or decrementing the crossing PI code according to which direction will reach the preset value faster.

8. The method of claim 1, wherein the reset condition comprises an asynchronous reset operation.

9. The method of claim 8, wherein the stepping comprises stepping the data PI code and the crossing PI code together with the offset maintained therebetween.

10. The method of claim 9, wherein the one or more criteria comprise the data PI code reaching a code value of 0.

11. The method of claim 1, wherein the performing comprises:
    adjusting the offset between the data PI code and the crossing PI code from the predetermined state based on the data stream; and
    performing the clock and data recovery on the data stream using the adjusted offset between the data PI code and the crossing PI code.

12. The method of claim 1, wherein the predetermined state comprises the data PI code having a code value of 0 and the crossing PI code having a code value equal to a preset value for the offset.

13. A clock and data recovery system, comprising:
    at least one phase interpolator (PI); and
    a clock and data recovery (CDR) circuit connected with the at least one PI, wherein the CDR circuit comprises one or more phase detectors and is configured to:
        detect occurrence of a reset condition;
        in response to occurrence of the reset condition, step at least one of a data PI code or a crossing PI code for each cycle of a system clock;
        stop the stepping based on one or more criteria of the data PI code or the crossing PI code to generate a predetermined state of the data PI code and the crossing PI code, wherein the predetermined state comprises an offset between the data PI code and the crossing PI code; and output the data PI code and the crossing PI code to the at least one PI.

14. The system of claim 13, wherein the CDR circuit is configured to step the at least one of the data PI code or the crossing PI code by incrementing the at least one of the data PI code or the crossing PI code by a single code value for each cycle of the system clock.

15. The system of claim 13, wherein the reset condition comprises an initial exit of the CDR circuit from a reset mode.

16. The system of claim 15, wherein the CDR circuit is configured to step the at least one of the data PI code or the crossing PI code by stepping the crossing PI code while holding the data PI code at a code value of 0.

17. The system of claim 16, wherein the CDR circuit is further configured to set the data PI code and the crossing PI code to have the code value of 0 before the crossing PI code is stepped.

18. The system of claim 16, wherein the one or more criteria comprise the crossing PI code reaching a code value equal to a preset value for the predetermined state.

19. The system of claim 13, wherein the reset condition comprises an asynchronous reset operation.

20. The system of claim 19, wherein:
the CDR circuit is configured to step the at least one of the data PI code or the crossing PI code by stepping the data PI code and the crossing PI code together with the offset maintained therebetween; and
the one or more criteria comprise the data PI code reaching a code value of 0.

* * * * *